United States Patent [19]

Broussard et al.

[11] 3,989,740

[45] Nov. 2, 1976

[54] METHOD OF PREPARING POLYALKYLENE GLYCOL ACRYLATES

[75] Inventors: Jerry A. Broussard; Gene J. Fisher, both of Corpus Christi, Tex.

[73] Assignee: Celanese Corporation, New York, N.Y.

[22] Filed: Nov. 10, 1975

[21] Appl. No.: 630,399

Related U.S. Application Data

[63] Continuation-in-part of Ser. No. 462,709, April 22, 1974, abandoned.

[52] U.S. Cl. .................... 260/486 R; 260/486 H; 260/615 R; 260/616; 260/637 R
[51] Int. Cl.² .......................................... C07C 69/54
[58] Field of Search ........ 260/486 H, 486 R, 615 B, 260/632 C, 616, 637 R, 615 R

[56] References Cited
UNITED STATES PATENTS

| | | | |
|---|---|---|---|
| 2,465,991 | 4/1949 | Anderson et al. | 260/486 |
| 2,867,651 | 1/1959 | Wise | 260/637 R |
| 3,003,002 | 10/1961 | Feinstein | 260/616 |
| 3,228,973 | 1/1966 | O'Connor | 260/486 |
| 3,639,459 | 2/1972 | Nissan | 260/486 |

FOREIGN PATENTS OR APPLICATIONS

62,049   6/1968   Germany

OTHER PUBLICATIONS

Feinstein, J. Org. Chem., 24, 1172–1173, (1959).

*Primary Examiner*—Jane S. Myers

[57] ABSTRACT

Monomeric esters of polyalkylene glycols and $\alpha$, $\beta$-unsaturated carboxylic acids are prepared, using a polyalkylene glycol or mono-ether derivative of an alkylene glycol or polyalkylene glycol which has a tendency to form peroxides, by heating a mixture of the glycol or derivative, a hydrocarbon solvent, and a small amount of a dilute caustic or sodium borohydride for a time and to a temperature sufficient to decompose the peroxide, and then reacting the glycol or derivative with an unsaturated acid such as acrylic acid or methacrylic acid in an inert atmosphere and in the presence of a suitable esterification catalyst and polymerization inhibitor. The crude reaction product is purified by extraction with an aqueous base, such as sodium carbonate, to remove acidic impurities and is thereafter treated with fuller's earth and decolorizing charcoal to remove any color bodies still present. The decolorizing agents are then removed by filtration.

17 Claims, No Drawings

METHOD OF PREPARING POLYALKYLENE GLYCOL ACRYLATES

This is a continuation-in-part of co-pending U.S. Patent Application Ser. No. 462,709 filed Apr. 22, 1974, now abandoned.

This invention relates to an improved method of preparing monomeric esters of alcohols and $\alpha,\beta$-unsaturated carboxylic acids and, more particularly, to the preparation of such esters using a polyalkylene glycol or a mono-ether derivative of an alkylene glycol or polyalkylene glycol which has a tendency to form peroxide impurities.

Conventional processes for the production of these esters involve the direct esterification of the alcohol with the unsaturated acid. The reaction is generally carried out in the presence of an acid catalyst and with the aid of an additive to inhibit the formation of polymers of the unsaturated reactant, the ester product, or both. Also, it is customary to conduct the reaction in the presence of an organic solvent, such as benzene or heptane, which forms an azeotrope with the water of reaction to facilitate its removal as esterification proceeds.

Despite the use of the polymerization inhibitor, varying amounts of polymeric by-products are ordinarily obtained in conventional esterification processes. As a result of polymer formation, esterification tends to be incomplete so that the crude reaction product, besides containing polymeric by-products, contains substantial amounts of unreacted or partially reacted glycol. The polymeric by-products often form stable emulsions upon neutralization of the crude reaction products, making product recovery by aqueous extraction impractical without resorting to additional separation techniques. The presence of unreacted glycol in the crude reaction product also interferes with product recovery using aqueous extraction since the glycol tends to increase the water solubility of the diester.

Some of those skilled in the art believed that the polymeric byproducts were due in large measure to the high reaction temperatures that are customarily employed. Thus, for example, U.S. Pat. No. 3,639,459, which issued Feb. 1, 1972, the patentee declares that the conventional process should be substantially modified by eliminating the solvent from the system and conducting the reaction at a temperature not exceeding about half of the boiling point of the acid. This approach suffers various disadvantages including the loss of acid reactant via the formation and removal of the acid/water-of-esterification azeotropes.

Others have suggested using various types of polymerization inhibitors to ameliorate the problem. And still others have suggested abandoning the conventional system altogether and substituting a very different approach involving transesterification. Transesterification also suffers serious disadvantages. The esterification reaction proceeds slowly in the presence of acidic or neutral catalysts. The rate of reaction can be increased by the use of a basic catalyst, but the use of such a catalyst results in a greater yield of the product formed by the addition of an alcohol across the carbon-carbon double bond of the $\alpha,\beta$-unsaturated carboxylic acid (Michael addition), which is a serious competing reaction. It is also reported that the methyl and ethyl esters of acrylic acid and methacrylic acid form hard-to-break azeotropes with methanol and ethanol respectively.

It has now been discovered that the amount of polymer formation can be greatly reduced simply by heating a mixture comprising the impure polyalkylene glycol, a hydrocarbon solvent, and a small amount of caustic or sodium borohydride to a temperature and for a time sufficient to decompose the peroxide impurity which is often associated with the polyalkylene glycol. The treated glycol is then immediately reacted with the unsaturated acid or is temporarily stored under conditions unfavorable to the formation of additional peroxides. The formation of polymeric byproducts can be kept to a minimum if this procedure is used in combination with performing the esterification reaction in a non-oxygen containing atmosphere and in the presence of free radical polymerization inhibitors which are effective in the absence of oxygen.

The process of this invention is predicated in part upon the appreciation of the fact that certain polyalkylene glycols, such as tetraethylene glycol, have a tendency to form hydroperoxides under certain conditions and that these peroxides may, under the conditions of an esterification reaction, decompose to form free radicals. These free radicals can initiate polymerization of vinyl functions, consume polymerization inhibitors, generate color, and cause formation of a product which results in the formation of intractable emulsions during neutralization. Polyalkylene glycols readily form hydroperoxides in the presence of air at temperatures of from 25° to 100° C. In the temperature range of from 70° – C, thermal decomposition of the hydroperoxides to form free radical species proceeds at an appreciable rate.

As in the conventional esterification reaction, the reaction may occur in a mixture of benzene and hexane, e.g., 3:1 (weight ratio), or other solvent as more fully described hereafter, and the reaction is driven to completion by the removal of water of esterification as a solvent water azeotrope. The organic phase is extracted with an excess of an aqueous base, such as aqueous sodium carbonate (10–15% by weight sodium carbonate), to remove acidic impurities and some of the polymerization inhibitor. After extraction, the monomeric diester solution is preferably treated with 0.5 – 1.0 weight percent based on the amount of monomeric ester present of fuller's earth and also with 0.5 – 1.0 weight percent of a decolorizing charcoal for from 1 to 2 hours at a temperature of from 25 – 60° C to remove the remaining color bodies. The fuller's earth plays the principal role because it shows a very strong and uncommon affinity for methylene blue, the preferred inhibitor for this process. The decolorizing agents are then removed by filtration.

After filtration, the solvent and water may be removed by vacuum flash distillation followed by vacuum gas stripping in a rotary flash evaporator. The monomeric diester temperature should be kept below 65° C and preferably should not be greater than 60° C to avoid or minimize polymerization, and pressures in the range of from 100 – 200 mmHgA are maintained. A gas stream consisting of nitrogen or preferably nitrogen and air is sparged through the stripping pot during this operation to strip out solvent. After stripping, the final product is filtered, advantageously with a filter aid, to remove suspended solids.

The glycol reactant used in the present invention may be any polyalkylene glycol or mono-ether derivative of an alkylene glycol or polyalkylene glycol which has a tendency to form thermally unstable peroxides. The invention is particularly applicable to polyalkylene glycols having two free reactive hydroxyl groups including mixtures of such glycols. The more commonly encountered and readily available glycols are straight chain polyethylene glycols which have the free reactive hydroxyl groups at each of their terminal ends. Preferably, the polyalkylene glycol comprises from 3 – 15 carbon atoms and most preferably 8 carbon atoms. Illustrative of suitable glycols are diethylene glycol, triethylene glycol, tetraethylene glycol, and pentaethylene glycol and the corresponding propylene glycols. Ordinarily, the glycol reactant has a molecular weight not greater than about 600.

The process of this invention is also applicable to the use of the ether-alcohol derivatives of alkylene and polyalkylene glycols, e.g. alkoxyalkanols or monoether derivatives of alkylene glycols or polyalkylene glycols. Thus, esters such as butoxyethyl acrylate can be prepared.

The unsaturated acid reactant used in the present method may be any $\alpha,\beta$-unsaturated monocarboxylic acid. Examples of unsaturated acids particularly suitable for use in preparing the diesters are acrylic acid (boiling point 141.9° C) and substituted acrylic acids, such as alkyl and halogen-substituted acrylic acids, e.g., methacrylic acid (boiling point 163° C), $\alpha$-ethylacrylic acid, crotonic acid (boiling point 189° C), tiglic acid (boiling point 198.5° C), and $\alpha$-chloroacrylic acid (boiling point 176° C).

This process generally results in the esterification of from about 97 – 99% of the available hydroxyl functionality. The reaction between the polyalkylene glycol and acrylic acid produces a mixture of the diacrylate and monoacrylate esters of the diol. An excess of the acid is required to drive the reaction essentially to completion under practical conditions of time and temperature. Generally an excess of 5 – 10 mole percent of acid should be employed based on the theoretical number of moles of hydroxyl function available for esterification. Greater excesses can be used but are undesirable from an efficiency standpoint.

For a fuller understanding of the inventive features of the process disclosed herein, reference should be had to the following detailed description.

In carrying out the inventive method, the polyalkylene glycol, a hydrocarbon solvent, and a small amount of caustic are charged to a suitable reactor, that is, a reactor equipped with heating and stirring means, gas sparger, temperature measuring means, distillation column, reflux condenser, and overhead phase separator.

The term "solvent" as used herein refers to the inert organic liquids conventionally used in esterification reactions as azeotroping agents for the water. Ordinarily, the organic liquids employed for azeotroping the water of esterification are essentially non-polar, organic solvents or diluents such as benzene, hexane, heptane, toluene, xylene, cyclohexane and trichloroethylene. Preferably, a mixed solvent system is employed in this process comprising 40 – 60% (preferably 50%) by weight of the reaction mixture; the solvent mixture should comprise 10 – 50% n-hexane and 50 – 90% benzene by weight. The solvent serves the typical functions of providing a medium in which the reaction occurs and of serving as an azeotroping agent for removing the water of reaction and thereby driving this equilibrium reaction to completion. The solvent also provides a means of controlling the temperature of the reaction mixture without resorting to temperature control based on operation under vacuum or close control of heat input. If the total solvent charge, e.g., 75 weight percent benzene and 25 weight percent hexane, comprises 50% by weight of the total reaction charge, the temperature of the reaction mixture varies in the range of 70° – 85° C during the run, gradually increasing as the reaction progresses toward completion. If a 50% by weight solvent charge consisting of benzene alone is employed, temperatures in the range of 80°–100° C are experienced during the run. The lower reaction temperature experienced when the mixed solvent system is employed substantially reduces emulsion formation during neutralization and color in the final product. The use of n-hexane alone as the reaction solvent is inadvisable because of the limited solubility of the reactants and products of this process in that solvent. It has also been observed that the use of a mixed solvent system comprising 50% by weight of solvent (consisting of 10 – 50 weight percent n-hexane and 50 – 90 weight percent benzene) greatly reduces emulsion formation during neutralizaton, relative to what is observed when benzene alone is employed as the reaction solvent.

Any strong caustic that has appreciable solubility under the proposed conditions can be used for the decomposition of the hydroperoxide. Thus, for example, sodium hydroxide or potassium hydroxide may be employed. The amount of caustic is not critical. As little as one part of caustic per one thousand parts of glycol is sufficient for the purpose. A tenfold increase or a twofold decrease probably has very little effect on the reaction. The aqueous caustic solution typically employed is about 4% by weight of sodium hydroxide (1.0 molar); concentrations in the range of from 1 – 50% by weight should work equally as well. It has also been discovered that sodium borohydride can be used to decompose the peroxides. Sodium borohydride should be used in a concentration within the range of from about 100 to about 1,000 parts per million based on the polyalkylene glycol.

The esterification reaction proceeds at atmospheric pressure. The mixture is heated at reflux throughout the esterification reaction; and the temperature of the reaction mixture is controlled by varying the composition of the reaction mixture, particularly the composition and concentration of the solvent. Usually the temperature of the reaction mixture at reflux increases throughout the run. Typical increases are on the order of 10° C over the entire run. Boilup may be held constant over a whole run or it may be cut back towards the end of the run as the rate of water formation decreases.

The preferred esterification reaction catalyst is methanesulfonic acid. Other catalysts which may be satisfactorily employed include p-toluenesulfonic acid, benzenesulfonic acid, and special purpose strong acid ion exchange resins of the sulfonic acid type such as the one sold by Rohm & Haas Company as "Amberlyst-15". Strong mineral acids such as sulfuric acid and phosphoric acids may be employed, but their use may result in substantially increased color levels in the product. The amount of catalyst employed will generally vary from 0.5 – 5.0% by weight of the total reaction charge. Preferred concentrations are in the range of from 1.0 – 2.0 weight percent.

Many polymerization inhibitors commonly used in conventional esterification reactions are not suitable in the present process because they are ineffective, or only marginally effective, in the absence of oxygen whereas the present process comprises carrying out the esterifications in the absence of oxygen (to avoid formation of hydroperoxides which, as explained herein, have been found to cause unexpected processing difficulties with the result that oxygen should be excluded from the system). Thus, such inhibitors as p-methoxyphenol, hydroquinone, pyrocatechol, and picric acid are not adequately effective in the present process since, in the absence of oxygen, their use is likely to result in massive polymerization within one-half to two hours after reflux is commenced. Broadly speaking, then, the polymerization inhibitors recommended for use in the present process are those inhibitors which are effective against vinyl-type polymerization in the absence of oxygen. Many such inhibitors are known to those skilled in the art, including the following: N,N'diphenyl-1,4-diaminobenzene; N,N'-dimethyl-1,4-diaminobenzene; N,N,N',N'-tetramethyl-1,4-diaminobenzene; p-benzoquinone; 2,5-dihydroxy-p-benzoquinone; 9-phenylanthracene; 2,2-diphenyl-1-picrylhydrazine; methylene violet; and phenothiazine-5-oxide.

In particular, however, phenothiazine, pyrogallol, p-phenylenediamine, and methylene blue, in a concentration from about 100 – 2000 parts per million based upon the $\alpha,\beta$-unsaturated carboxylic acid, have been found useful in this system. All these materials, including the four last-named, although effective in inhibiting polymerization, have the disadvantage of being intensely colored or of tending to decompose under reaction conditions to form intensely colored products. These colored substances, with the exception of methylene blue, cannot be readily removed by ordinary purification procedures. High color concentrations are unsatisfactory in many coating end uses because of appearance and cure rate considerations. Methylene blue is, therefore, the most preferred reaction inhibitor. It effectively inhibits the polymerization reactions and has the added advantage of being able to be readily removed after the reaction step is complete. The preferred concentration for methylene blue is in the range of from 500 – 1,000 parts per million based on the carboxylic acid.

It is desirable to also add to the reaction mixture p-methoxyphenol (MEHQ) as an inhibitor in the range of from 100 – 200 parts per million based upon the carboxylic acid. This inhibitor is not removed during processing and is, therefore, present in the finished product to inhibit polymerization in the stored product.

The reaction is conducted at atmospheric pressure at reflux, which ordinarily should be in the range of from 70° – 85° C. A non-oxygen containing atmosphere is provided by sparging an inert gas such as nitrogen through the reaction mixture throughout the run or by sparging the system with nitrogen initially to displace the oxygen and then running the reaction under a blanket of nitrogen gas. The water of reaction is taken overhead as the solvent-water azeotrope, thereby driving the reaction to completion. At the end of the reaction the principal components of the reaction mixture are diester, monoester, free acid, catalyst, inhibitors, and solvents.

The present invention is further illustrated by the following example which describes a laboratory process for preparation and purification of tetraethylene glycol diacrylate.

EXAMPLE

Summary

Tetraethylene glycol diacrylate (TEGDA) is prepared by the sulfonic acid catalyzed direct esterification of tetraethylene glycol (TEG) with glacial acrylic acid in a benzene-hexane mixture. A mixture of methylene blue (MB) and p-methoxyphenol (MEHQ) is used to inhibit polymerization and the reaction is conducted under an oxygen-free nitrogen atmosphere. Immediately prior to esterification, the TEG is treated with dilute NaOH to decompose the peroxides present in this material.

The crude product (TEGDA) is purified by (1) extraction with an aqueous base to remove acidic impurities and most of the MB: (2) treatment with fuller's earth and activated charcoal to remove MB and color; (3) vacuum flashing and stripping to remove solvent and water; and (4) filtration to remove suspended solids.

Apparatus

TEG Pretreatment & Reaction

The reaction vessel is equipped with heating facilities, good stirring apparatus, gas sparger, temperature measuring device, short distillation column, reflux condenser, and overhead phase separator.

Purification a. Extraction - a vessel equipped with good stirring apparatus and bottom mounted liquid take off.

b. Fuller's earth and charcoal treatment - a vessel equipped with a good stirrer and an effective filtration device.

c. Solvent removal - a vessel equipped with an effective stirrer, a nitrogen-air gas sparger, temperature measuring device, heating facilities, effective overhead condenser, and vacuum capability.

Detailed Description

For pretreatment and reaction, a 12-liter round bottom flask equipped with a heating mantle, mechanical stirrer, thermometer well, gas sparger, 5-tray, 2-inch Oldershaw column, efficient condenser, and overhead phase separator was employed. Into the reaction vessel were placed the following materials:

| Tetraethylene Glycol | 2328 g | 12.0 moles |
|---|---|---|
| Benzene | 3107 g | |
| n-Hexane | 1035 g | |
| Aqueous 4 % NaOH | 60 ml | |

The mixture was stirred and heated at reflux for 1–2 hours. During the operation a small stream of $N_2$ (0.1 SCFH) was sparged through the liquid phase to exclude air from the system. The following materials were next added to the reaction vessel:

| Glacial Acrylic Acid(HACA) (with 200 ppm-MEHQ) | 1814 g | 25.2 moles |
|---|---|---|
| Methylene Blue Aqueous 70 % | 1.8 g | |
| Methanesulfonic Acid | 166 g | |

The mixture was refluxed with rapid mechanical stirring under an inert nitrogen atmosphere. The reaction was driven to completion by removing the water of reaction overhead as the solvent-water azeotrope. After approximately 11 – 12 hours the reaction was judged complete based on the amount of water collected. Alternatively, the free acid concentration can be used as a measure of the degree of esterification. Temperature range for entire reaction was 73° – 78° C.

The crude reaction mixture was cooled down to 25° – 35° C, combined solvent concentration adjusted to 52 weight percent, and the mixture extracted with 1 × 1300 ml of aqueous 13% $Na_2CO_3$ (~ 25% excess). The mixture was stirred for ~ 30 minutes and then allowed to settle for an additional 30 minutes. The dark blue colored aqueous phase was then drawn off and discarded. This procedure removed the sulfonic acid, excess acrylic acid, and much of the MB.

Next, 36 g. each (1% by weight of the theoretical TEGDA yield) of fuller's earth and activated charcoal ("Pittsburgh" activated carbon Type RC pulverized) were added to the organic phase, and the mixture was stirred at ambient temperature for 1 – 2 hours. After properly contacting these agents with the TEGDA solution, the fuller's earth and activated carbon were removed by vacuum filtration without added filter-aid. This operation removed the remaining methylene blue and most of the color bodies.

For the solvent removal step, a rotary evaporator equipped with a gas sparger discharging below the liquid level, an efficient chilled condenser, and a vacuum system able to lower the pressure on the system to about 125 mm HgA were employed. TEGDA samples (about 1 kg each) containing approximately equal amounts of TEGDA and solvent (benzene and n-hexane) were vacuum flashed and then vacuum stripped until the concentration of solvents (mainly benzene) in the TEGDA was ≤ 0.5% weight. During this operation gas sparge rates of 0.1 SCFH air and 0.2 – 2.0 SCFH nitrogen were employed. The bath temperature was not allowed to exceed 65° C and was generally kept at 60° – 65° C. Stripping time under these conditions was in the range of 1 – 2 hours per sample. After stripping, the product was slurried with 1/2 weight percent filter aid and refiltered to remove the remaining suspended solids. Typical yields are on the order of 95% based on the TEG and 90% based on the HACA.

Products obtained by the method typically had the following properties:

| | |
|---|---|
| Saponification No. (mg KOH/g) | 350–370 |
| Acid No. (mg KOH/g) | ≤ 1.0 |
| $H_2O$ (% weight) | ≤ 0.1 |
| Inhibitor | |
| MEHQ (ppm) | ~100 |
| MB (ppm) | <1 |
| Viscosity, 25° C (cps) | 17–19 |
| APHA color | 50–200 |
| Peroxides | 10–25 ppm |
| Density, 25° C (g/cc) | 1.11 |
| Residual Solvent (% weight) | ≤ 0.5 |

As will be apparent to those skilled in the art, certain changes may be made in the above procedure while still achieving the benefits of the present invention. For example, other polymerization inhibitors and other acid esterification catalysts as conventionally used in the art, whether organic or inorganic, may be employed.

Results similar to those obtained above may be achieved in the preparation and recovery of other polymerizable monomeric diesters. Typical of the diesters that may be produced according to the present method are diethylene glycol dimethacrylate, triethylene glycol dimethacrylate, tetraethylene glycol dimethacrylate, dipropylene glycol dimethacrylate, tripropylene glycol dimethacrylate, and the corresponding diesters of acrylic acid and of other substituted acrylic acids. Typical of monoesters that can be prepared by the present process are the acrylic acid, methacrylic acid, and other substituted acrylic acid esters of ethylene glycol monobutyl ether, diethylene glycol monobutyl ether, triethylene glycol monobutyl ether, and tetraethylene glycol monobutyl ether.

The monomeric esters prepared in accordance with this invention may be polymerized in the presence of peroxides or other polymerization catalysts employing bulk, aqueous emulsion or dispersion, or solution polymerization techniques. Accordingly, the polymerizable monomeric esters find utility in the manufacture of castings of various shapes, as impregnating and laminating compositions, as surface coating compositions, and in the preparation of polymeric sheets, tubes and rods. These polymerizable polyfunctional monomers can also be used in end uses such as radiation cured coatings and printing inks.

Since certain changes may be made in the above method without departing from the scope of the invention herein involved, it is intended that all matter contained in the above description shall be interpreted as illustrative and not in a limiting sense.

The embodiments of the invention in which an exclusive property or privilege is claimed are defined as follows:

1. A method of preparing polymerizable monomeric esters of a polyalkylene glycol or the ether-alcohol derivative of an alkylene glycol or polyalkylene glycol, which glycol or derivative has a tendency to form thermally unstable peroxides, which process comprises heating a mixture of said glycol or derivative, a hydrocarbon solvent, and an effective amount of a caustic or sodium borohydride for a time and at a temperature sufficient to decompose said peroxide; and reacting said treated glycol or derivative with an $\alpha,\beta$-unsaturated monocarboxylic acid selected from the group consisting of acrylic acid, alkyl substituted acrylic acids and halogen substituted acrylic acids in a non-oxygen containing atmosphere in the presence of a suitable esterification catalyst and a polymerization inhibitor which is effective in the absence of oxygen for a time and at a temperature sufficient to obtain the desired yield of monomeric ester.

2. A method according to claim 1 wherein said polymerization inhibitor is selected from the group consisting of phenothiazine, pyrogallol, p-phenylenediamine and methylene blue.

3. A method according to claim 2 wherein said mixture is heated to reflux for from ¾ to 3 hours and wherein said effective amount of caustic is 500 to 10,000 ppm and said effective amount of sodium borohydride is about 100 to 1000 ppm based on the polyalkylene glycol.

4. A method according to claim 1 wherein said polymerization inhibitor is methylene blue.

5. A method according to claim 4 wherein the crude product of the esterification reaction is purified by extraction with an aqueous base to remove acidic impurities and thereafter treated with fuller's earth and decolorizing charcoal to remove any color bodies still present.

6. A method of preparing polymerizable monomeric diesters of a polyalkylene glycol which has a tendency to form a thermally unstable peroxide; which process comprises: treating a mixture of said glycol, a hydrocarbon solvent, and a caustic for a time and to a temperature sufficient to decompose said peroxide; and reacting said purified glycol with an $\alpha,\beta$-unsaturated monocarboxylic acid selected from the group consisting of acrylic acid, alkyl-substituted acrylic acids and halogen substituted acrylic acids in the presence of an esterification catalyst and a polymerization inhibitor selected from the group consisting of phenothiazine, pyrogallol, p-phenylenediamine and methylene blue at a temperature for a time sufficient to obtain the desired yield of the diester.

7. A method according to claim 6 wherein methylene blue is the polymerization inhibitor.

8. A method according to claim 6 wherein said solvent comprises from 10 – 50% n-hexane and 50 – 90% benzene.

9. A method according to claim 7 wherein the crude reaction product is purified by extraction with an aqueous base to remove acidic impurities and thereafter treated with fuller's earth and decolorizing charcoal to remove any color bodies still present.

10. A method of preparing tetraethylene glycol diacrylate using tetraethylene glycol which has a tendency to form a hydroperoxide which process comprises: heating a mixture of said tetraethylene glycol, a hydrocarbon solvent and sodium or potassium hydroxide, in an amount sufficient to promote the decomposition of said hydroperoxide, to a temperature and for a time sufficient to decompose said hydroperoxide; and reacting in a non-oxygen containing atmosphere said tetraethylene glycol with acrylic acid in the presence of a suitable esterification catalyst and a free radical polymerization inhibitor which is effective in the absence of oxygen at a temperature and for a time sufficient to obtain the desired yield of tetraethylene glycol diacrylate.

11. A method according to claim 10 wherein said mixture is heated to reflux for from ¾ to 3 hours.

12. A method according to claim 10 wherein said free radical polymerization inhibitor is selected from the group consisting of phenothiazine, pyrogallol, methylene blue, and p-phenylenediamine.

13. A method according to claim 10 wherein said polymerization inhibitor is methylene blue.

14. A method according to claim 13 wherein the product of the esterification reaction is further purified by extraction with an aqueous base to remove acidic impurities and thereafter treated with fuller's earth and decolorizing charcoal to remove any color bodies still present, whereby an essentially colorless tetraethylene glycol diacrylate is prepared under conditions which essentially preclude polymerization of the monomer.

15. A process for preparing a polymerizable monomeric diester of a polyalkylene glycol which has a tendency to form thermally unstable hydroperoxides comprising reacting a polyalkylene glycol, which has been pretreated with caustic or sodium borohydride to remove thermally unstable peroxides associated therewith, with an $\alpha,\beta$-unsaturated monocarboxylic acid selected from the group consisting of acrylic acid, alkylsubstituted acrylic acids, and halogen substituted acrylic acids in an inert atmosphere in the presence of a suitable esterification catalyst and a polymerization inhibitor selected from the group consisting of phenothiazine, pyrogallol, p-phenylenediamine and methylene blue.

16. A method according to claim 15 wherein said polymerization inhibitor is methylene blue.

17. A method according to claim 16 wherein additionally the product of the esterification reaction is purified by extraction with an aqueous base to remove acidic impurities and thereafter treated with fuller's earth and decolorizing charcoal to remove any color bodies still present.

* * * * *